F. PACHECO.
SWIMMING DEVICE.
APPLICATION FILED APR. 9, 1918.
1,268,762.
Patented June 4, 1918.
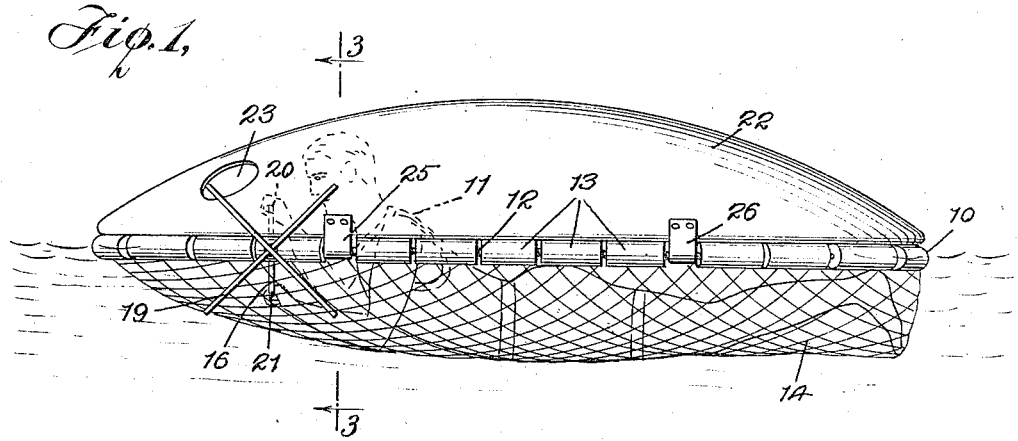
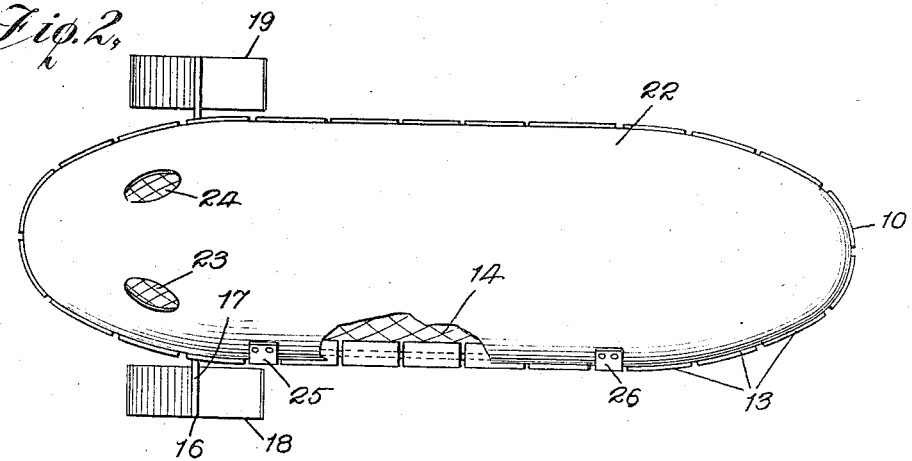
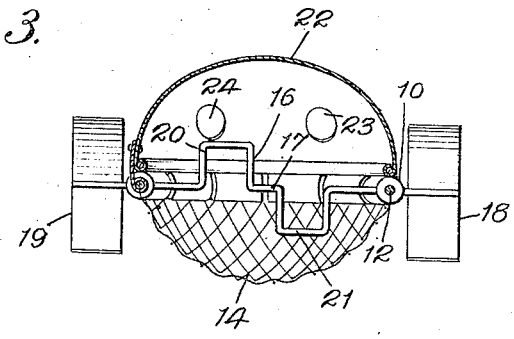
INVENTOR
Frederico Pacheco.
BY
W. T. Criswell
ATTORNEY

UNITED STATES PATENT OFFICE.

FREDERICO PACHECO, OF BROOKLYN, NEW YORK.

SWIMMING DEVICE.

1,268,762.  Specification of Letters Patent.  Patented June 4, 1918.

Application filed April 9, 1918. Serial No. 227,464.

*To all whom it may concern:*

Be it known that I, FREDERICO PACHECO, a citizen of the United States, and a resident of New York, borough of Brooklyn, in the county of Kings and State of New York, have invented a certain new and useful Improvement in Swimming Devices, of which the following is a full, clear, and exact specification.

This invention relates more particularly to a class of devices for carrying a person in the water.

My invention has for its object primarily to provide a device designed to be employed so that a person may be safely and easily carried in the water without risking the danger of drowning, and which may be also used as a life preserver as occasion requires, besides being adaptable for utilization as an amusement device at water resorts during warm weather. The invention consists essentially of an annular float for reception of a person, and suspended from the float is an intersticed flexible hull or bag for preventing a person from sinking beyond a predetermined depth in the water when in a reclining position.

Other objects of the invention are to provide a mechanism which is operable by the person within the float so that the device may be propelled in the water; to provide on the float a cover which may be made to represent a fish or other object; and to provide a device of a simple, efficient and durable construction which is susceptible of being made in various shapes and sizes.

A practical embodiment of the invention is represented in the accompanying drawing forming a part of this specification in which similar characters of reference indicate corresponding parts in all the views, the said invention being more fully described hereinafter, and then pointed out in the claims at the end of the description.

In the drawing, Figure 1 is a side elevation of one form of swimming device embodying my invention.

Fig. 2 is a top plan, partly broken away, of the device, and

Fig. 3 is a sectional view taken on the line 3—3 of Fig. 1.

The device has a float 10 which is preferably substantially elliptic in horizontal section as well as being of a size to comfortably accommodate a person, as 11. The float 10 may be made of an annular rod 12 having a suitable number of blocks, 13, of cork or other material of required sizes adapted to float on water for preventing the person from sinking, and suspended from the annular float is a flexible hull or bag, 14. The hull 14 may be made of netting or other intersticed material of a size whereby the person will be supported near the surface of the water, besides allowing the water to flow freely through the hull.

In order to permit the float and hull or net to be propelled in the water by the person carried therein, I provide a driving mechanism, as 16. The mechanism 16 may be of any suitable type, though the mechanism illustrated is composed of a shaft or rod 17 which is arranged crosswise of the forward part of the float 10, and this shaft is rotatably disposed through registered orifices provided in the float. The shaft 17 is of a length so that its ends protrude laterally some distance beyond the float, and on these protruding ends of the shaft are propellers, as 18 and 19. Each of the propellers may be made with any desired number of blades, for example, each propeller may consist of four radially disposed blades, as shown. The central part of the shaft 17 within the float is provided with one or more crank handles, as 20 and 21, and these handles are preferably formed by bending parts of the shaft in substantially U-shapes so that the handles are disposed in opposite directions. Thus when the device is in use with a person therein, as illustrated in Fig. 1, one or both of the handles 20 and 21 may be gripped by the person. By then swinging the handles revolubly in the fashion of turning a crank the propellers 18 and 19 will be operated accordingly to cause the float with the person to be safely propelled forwardly or backwardly in the water.

If desired the device may be made to represent a large fish, and especially if the device is used at water resorts during warm weather. This is accomplished by providing a cover, as 22, which may be made of any suitable light-weight material of somewhat the shape of an inverted elongated bowl. The cover 22 corresponds in size to the diameter of the annular float 10, and in the forward part of the cover may be two openings, as 23 and 24, which serve as windows through which the person in the device may see. The cover is movably arranged on top of the float so that its concavity is in opposed relation to the flexible intersticed hull 14. When the device is in use the cover will then protrude above the water, and the cover may be hinged, as at 25 and 26, to the rod 12 of the float 10 to allow the cover to be swung to open and closed positions on the float. In this manner I provide a simple and efficient device whereby a person may be safely and easily carried in water at summer resorts and elsewhere without risking the danger of drowning.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. A swimming device comprising a float, a flexible intersticed hull on the float for supporting a person, means on the float, operable by the person whereby the float, hull and person will be propelled in the water, and a movable cover on top of the float.

2. A swimming device comprising an annular float with a suspended flexible intersticed hull for accommodating a person, means on the float whereby the float, hull and person will be propelled in the water, and a cover hinged on the top of the float.

3. A swimming device comprising an annular float with a suspended flexible intersticed hull for accommodating a person, a propeller on the float, operable by the person to propel the float and hull, and a movable cover on the float.

4. A swimming device comprising an annular float with a suspended flexible intersticed hull for accommodating a person, two propellers on the float, operable by the person to propel the float and hull, and a cover on the float, hinged so as to be swung to open and closed positions.

This specification signed and witnessed this 8th day of April, A. D. 1918.

FREDERICO PACHECO.

Witness:
E. W. JONES.

Copies of this patent may be obtained for five cents each, by addressing the "Commissioner of Patents, Washington, D. C."